W. RUCKER, Sr.
Harrow.
No. 232,764. Patented Sept. 28, 1880.
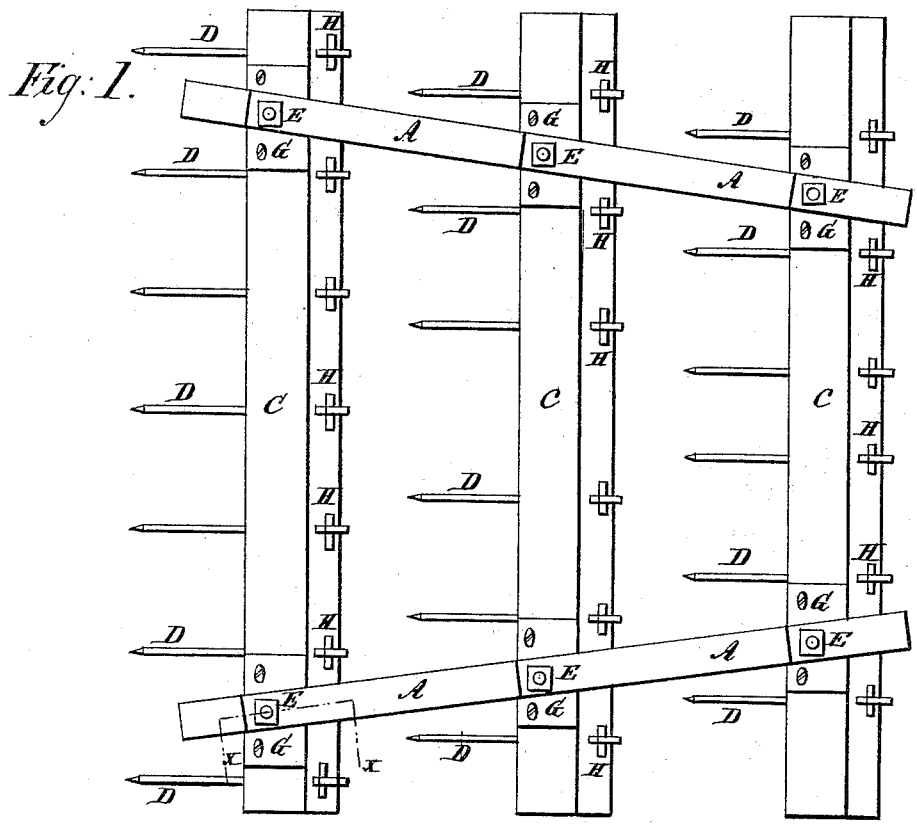
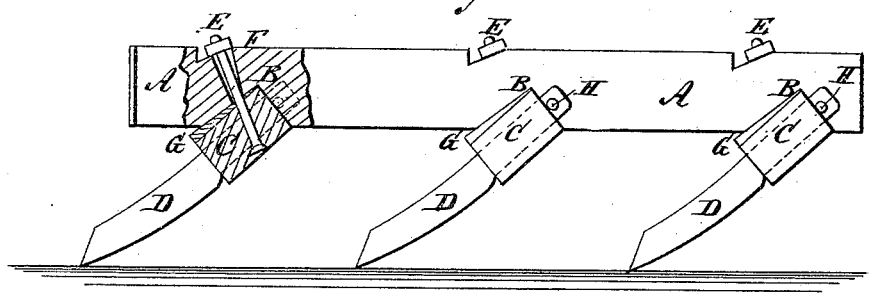
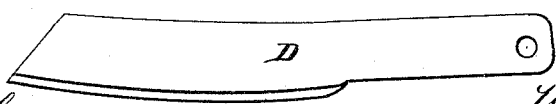
WITNESSES:
A. Schehl.
C. Sedgwick
INVENTOR:
W. Rucker, Sr.
BY Munn & Co.
ATTORNEYS.

United States Patent Office.

WILLIAM RUCKER, SR., OF MURFREESBOROUGH, TENNESSEE.

HARROW.

SPECIFICATION forming part of Letters Patent No. 232,764, dated September 28, 1880.

Application filed December 30, 1879.

*To all whom it may concern:*

Be it known that I, WILLIAM RUCKER, Sr., of Murfreesborough, in the county of Rutherford and State of Tennessee, have invented a new and useful Improvement in Harrows, of which the following is a specification.

In the drawings, Figure 1 is a plan view of the improvement. Fig. 2 is a side elevation, partly in section, through the line $x$ $x$, Fig. 1, and Fig. 3 is a side view of one of the knives.

Similar letters of reference indicate corresponding parts.

The object of this invention is to furnish harrows so constructed that they will thoroughly pulverize the soil, will readily pass over obstructions, will not be liable to clog, will level and smooth the ground, and may be adjustable to work at any desired depth in the ground.

A represents the longitudinal bars of the harrow-frame, two or more of which may be used according to the required size of the harrow. In the lower edges of each bar A are formed three or more obtuse-angled notches, B, which are made with their rear sides the longer, according to the inclination desired to be given to the cross-bars C and knives D of the harrow.

C are the cross-bars, three or more of which are used accordingly as a larger or smaller harrow is required.

The cross-bars C are arranged with their forward upper angles in the notches B of the bars A, and are secured to the said bars A by bolts E, which pass through holes F in the bars C A, and have nuts screwed upon their upper ends.

The bolt-holes F through the bars A are made V-shaped, as shown in Fig. 2, to allow the bolts E to change their position as the inclination of the bars C is changed.

The inclination of the bars C is changed to give more or less inclination to the knives D by wedges G inserted between the said bars C and the sides of the notches B in the bars A.

The forward ends of the wedges G are slotted to receive the bolts E, so that the said wedges can be attached, detached, and adjusted without removing the said bolts E.

The knives D are slightly curved and their forward edges are made sharp. The shanks of the knives D are inserted in holes in the bars C, and are secured in place by pins H passed through their ends, or by other suitable means.

With this construction the bars C will act as scrapers to remove soil from the higher places and deposit it in the lower places, leaving the ground level and smooth, and at the same time the knives D will cut in pieces and pulverize all lumps, clods, and sods, leaving the soil in excellent condition to receive seed.

When the front cross-bar comes in contact with a clod the latter is crushed down until the lower extremity of the cross-bar reaches it, where it is caught by the cutters and cut to pieces; then the second cross-bar more minutely crushes, while its knife subdivides the pieces, and the same is then done with the third cross-bar. Hence it will be seen that the crushing and cutting are alternate and the work done with the smallest expenditure of power, the cross-bars crushing the clods, smoothing the soil, and carrying the blades, so as not to impede, but assist, in the pulverization of the soil.

What I claim as new and of my invention is—

In a combined clod-crusher and harrow, the combination, with screw-bolts, nuts, and wedges, substantially as described, of the bars A, having angular notches and taper holes, and the angular bars C, carrying inclined teeth and held in said notches of bars A, as shown and specified.

WILLIAM RUCKER, SR.

Witnesses:
W. N. DOUGHTY,
T. R. HALLOWELL.